(12) United States Patent
Ganiere

(10) Patent No.: US 10,106,110 B1
(45) Date of Patent: Oct. 23, 2018

(54) DIRECT CURRENT POWER MANAGEMENT SYSTEM

(71) Applicant: Jeffrey R. Ganiere, Tarpon Springs, FL (US)

(72) Inventor: Jeffrey R. Ganiere, Tarpon Springs, FL (US)

(73) Assignee: GANIERE INNOVATIONS, L.L.C., Tarpon Springs, FL (US)

( * ) Notice: Subject to any disclaimer, the term of this patent is extended or adjusted under 35 U.S.C. 154(b) by 578 days.

(21) Appl. No.: 14/807,459

(22) Filed: Jul. 23, 2015

Related U.S. Application Data

(60) Provisional application No. 62/028,096, filed on Jul. 23, 2014, provisional application No. 62/126,081, filed on Feb. 27, 2015.

(51) Int. Cl.
*H02J 7/00* (2006.01)
*B60R 16/033* (2006.01)

(52) U.S. Cl.
CPC .................. *B60R 16/033* (2013.01)

(58) Field of Classification Search
CPC .......... H02J 7/00; H02J 7/0013; H02J 7/0024; B60R 16/03; B60R 16/033; Y10T 307/653
USPC ........................... 307/9.1, 10.1, 71
See application file for complete search history.

(56) References Cited

U.S. PATENT DOCUMENTS

| | | | | |
|---|---|---|---|---|
| 6,873,133 | B1* | 3/2005 | Kavounas | H02J 7/345 320/103 |
| 7,800,247 | B2* | 9/2010 | Chang | H02J 3/32 307/44 |
| 2006/0092583 | A1* | 5/2006 | Alahmad | H02J 7/0024 361/15 |
| 2012/0003526 | A1* | 1/2012 | Kume | H01M 2/0262 429/151 |
| 2014/0077764 | A1* | 3/2014 | Brun-Buisson | H01M 10/425 320/117 |

* cited by examiner

*Primary Examiner* — Hal Kaplan
(74) *Attorney, Agent, or Firm* — Allen, Dyer, Doppelt + Gilchrist, PA

(57) ABSTRACT

A vehicle power system may include a vehicle power source configured to output a first voltage, and batteries, each battery configured to provide a second voltage. The vehicle power system may also include switches coupled between the batteries, and a controller coupled to the switches. The controller may be configured to place the switches in a first mode of operation so that the batteries are coupled in parallel and receive a charge from the vehicle power source, and place the switches in a second mode of operation so that the batteries are coupled in series and provide a combined voltage greater than the first voltage and the second voltage, the combined voltage driving a load.

20 Claims, 3 Drawing Sheets

DIRECT CURRENT POWER MANAGEMENT SYSTEM

RELATED APPLICATION

This application is based upon prior filed provisional patent application No. 62/028,096 filed Jul. 23, 2014, and provisional patent application No. 62/126,081, filed Feb. 27, 2015, the entire subject matter of which are incorporated herein by reference in their entirety.

TECHNICAL FIELD

The present invention is directed to a vehicle power system, and more particularly, to a vehicle power system for providing power from batteries to a load and related methods.

BACKGROUND

The electrical requirements for the automotive, truck, boat and recreational vehicle industry have, with few exceptions, become standardized using twelve volt direct current (DC) electrical systems and using one or more twelve volt batteries wired in parallel for storage. Most vehicles have twelve volt lights, twelve volt starter motor and twelve volt ancillary motors for such things as windshield wipers, electric door locks and power windows. The twelve volt systems work well and twelve volt fractional horsepower motors are ideal for intermittent use as the current draw for these small motors is not great. Twelve volt engine starter motors produce very high torque for engine starting, but at a very high current draw, often in the range of 400 amperes per hour. These motors can only run for a few minutes before they drain the vehicle battery bank and/or burn up.

The twelve volt base electrical systems in vehicles have precluded the development of practical and efficient electrically driven equipment such as air compressors, hydraulic pumps, air conditioners and vacuum systems to be mounted on service, recreational, or over the road vehicles. As an example: If a service truck requires an air compressor for inflating tires, or running air tools, the compressor is invariably driven by an internal combustion engine. The engine requires much maintenance, is expensive to run and emits pollutants into the atmosphere. Twelve volt DC motors draw far too much current to make such a compressor a viable portable option for a continuous air supply.

Hydraulic systems for tow trucks and auxiliary hydraulic power take-offs are driven by pumps that the vehicle engine powers, or by auxiliary internal combustion engines mounted on the vehicle. Such engine-powered hydraulic pumps for equipment like hydraulic lifts, or hydraulic chain saws are lighter, safer and easier to use than their internal combustion engine counterparts. However, an internal combustion engine must be running all the time and they are loud and dirty and high maintenance items.

Owing to new electric motor technology developed over the past decade, a plethora of electric motor types have been developed to deliver very high torque at a small fraction of the current draw of direct DC, 12 volt motors, in part because higher voltage motors draw fewer amps (Ohm's Law, (I=V/R)). Motors such as "brushless DC" and 48 volt AC motors are becoming common in industry for such things as golf carts and fork lift trucks, but they are based on a forty-eight volt platform requiring battery chargers to run from a 110/220 volt ac power source. No satisfactory system exists that allows high torque, 24, 36 or 48 volt motors to be run from a 12 volt source.

SUMMARY

Generally speaking, a vehicle power system may include a vehicle power source configured to output a first voltage, and a plurality of batteries, each battery configured to provide a second voltage. The vehicle power system may also include a plurality of switches coupled between the batteries, and a controller coupled to the plurality of switches. The controller may be configured to place the plurality of switches in a first mode of operation so that the plurality of batteries is coupled in parallel and receives a charge from the vehicle power source, and place the plurality of switches in a second mode of operation so that the plurality of batteries is coupled in series and provides a combined voltage greater than the first voltage and the second voltage, the combined voltage driving a load.

DETAILED DESCRIPTION

Figure 1:
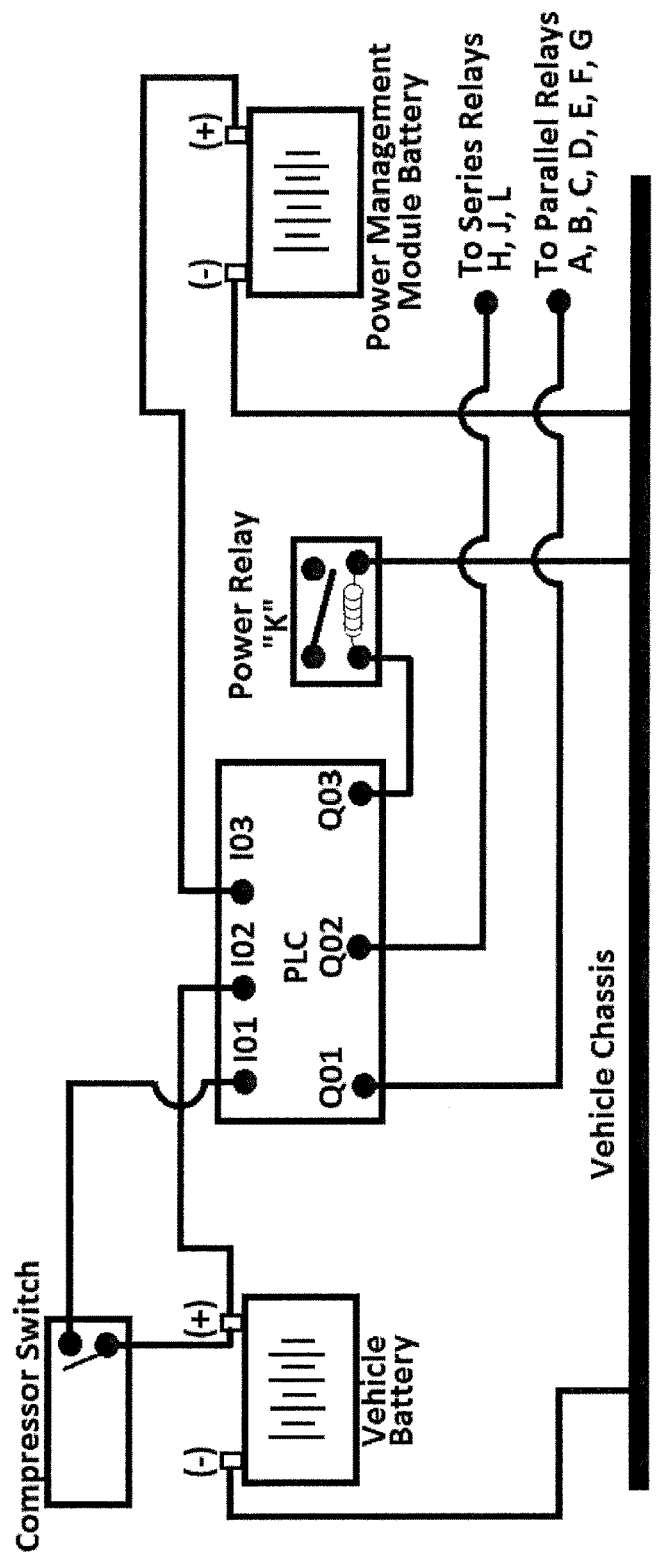
FIG. 1 is a schematic diagram of a vehicle power system, according to the present invention.

The present invention melds twelve volt DC vehicular generating systems with twenty four, thirty six, or forty eight or any motor voltage evenly divisible by twelve. The invention may also be used in any vehicle, including but not limited to, automobiles, trucks, commercial trucks, boats, etc.

The invention uses a bank of batteries separate from the host vehicle batteries and charging system to build, in a series mode, the appropriate voltage to run motors at a higher voltage than 12 volts. Example, two batteries for 24 volts, three batteries for 36 volts, four batteries for 48 volts, etc. This separate bank of batteries remains switched to a parallel configuration which allows for individual battery charging from the host 12 volt system. At the moment a demand for a higher voltage is received, the parallel configuration is turned "off" to isolate each battery. The batteries are then switched, via the use of mechanical or solid state relays, to a series configuration, thus providing the higher voltage required to do the work.

This invention supplies electrical power for running motors of a higher voltage requirement than that of the vehicle, or boat base electrical system to run compressors or pumps on an intermittent basis. Consequently, equipment normally reliant on an internal combustion engine or an electrical power inverter can be powered by an electric motor with my invention.

In short, the basis of the present invention is the "Power Management Module" and a bank of batteries. The Power Management Module automatically switches the battery bank between a "parallel" state and a "series" state depending on a requirement. Again, to reemphasize, that although a common example of one embodiment of the present invention described herein and in the accompanying schematics refers to a 48 volt motor, requiring a bank of four 12 volt batteries, the present invention may be applied to any system requiring a bank of batteries equaling 24, 36, 48, etc.

By way of example, to run a 48 volt motor with the present inventive system, the Power Management Module must configure the battery bank to a "series" configuration to supply 48 volts for the motor. When the motor is finished running, the Power Management Module must re-configure the battery bank to a "parallel" configuration so that the vehicle 12 volt battery system can charge the batteries. The Power Management Module also embodies several other functions so as to make this system reliable. These functions will be described later.

An example for which the present invention is particularly useful would be on sailboats of sufficient size to allow for extended cruising. Typically, electric anchor windlasses are powered by 12 volt direct DC motors, motors that are much the same as starter motors for internal combustion engines. The problem is that the current draw with a 12 volt DC windlass motor is so high as to require additional batteries to be installed in the bow of the boat, near the windlass, a place where extra weight becomes critical for waterline trim. Additionally, sheet and halyard winches are usually manual crank drum type winches. With the present invention, one configuration would be to use a 48 volt AC motor and controller to power a hydraulic pump.

Hydraulic motors could be used to turn winches and a windlass with only small hydraulic lines lead from a central part of the vessel. When a winch was called upon for service, the present invention would switch four of the house batteries to 48 volt series configuration, and back to 12 volt parallel when the work is completed. This would be an ideal application for the present invention as winch and windlass usage are typically of a low duty cycle, but critical to maintaining proper sail trim while underway. To recharge the batteries, it is common to run the sailboat engine at least one hour per day while on a passage to charge the battery bank. Many systems on board require 12 volt based power, such as running lights, navigation systems and refrigeration.

Another excellent example for the present invention would be a vehicle mounted air compressor. For example, a 6 horsepower (hp), 3-phase, 48 volt AC motor with controller would be the appropriate size to turn a compressor that compresses air at the rate of 22 cubic feet per minute to 175 psi. The compressor stores energy in its reservoir for later use. The motor and pump are designed to run intermittently, a perfect application for the present invention.

As described above, the present invention uses a bank of batteries separate from the host vehicle batteries and charging system to build, in a series mode, the appropriate voltage to run motors at a higher voltage than 12 volts. Example, two batteries for 24 volts, three batteries for 36 volts, four batteries for 48 volts, etc. This separate bank of batteries remains switched to a parallel configuration which allows for individual battery charging from the host 12 volt system. At the moment a demand for a higher voltage is received, the parallel configuration is turned "Off" to isolate each battery. The batteries are then switched, via the use of mechanical or solid state relays, to a series configuration, thus providing the higher voltage required to do the work.

Figure 2:
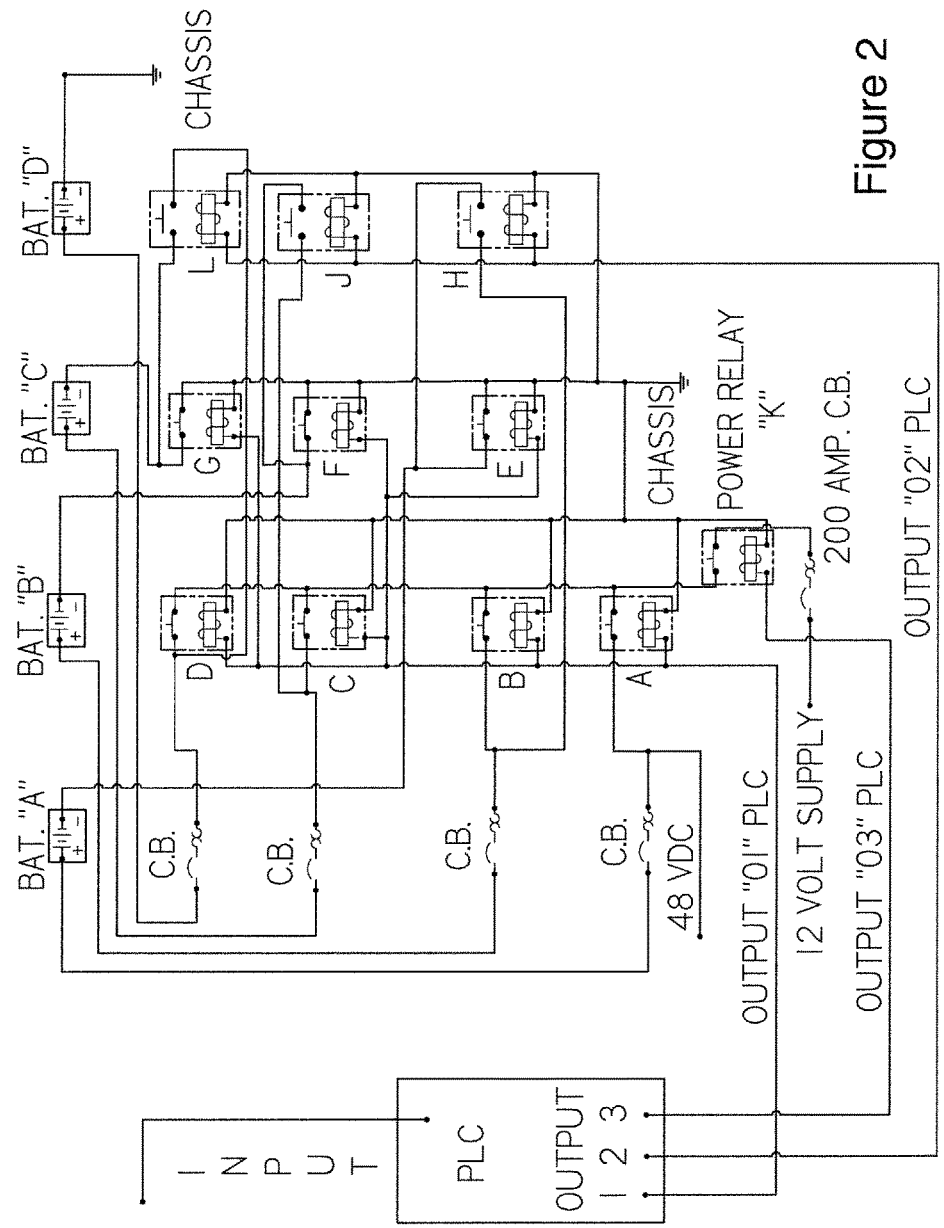
FIG. 2 is a schematic diagram of 48 volt example embodiment with the invention in a parallel mode.
Figure 3:
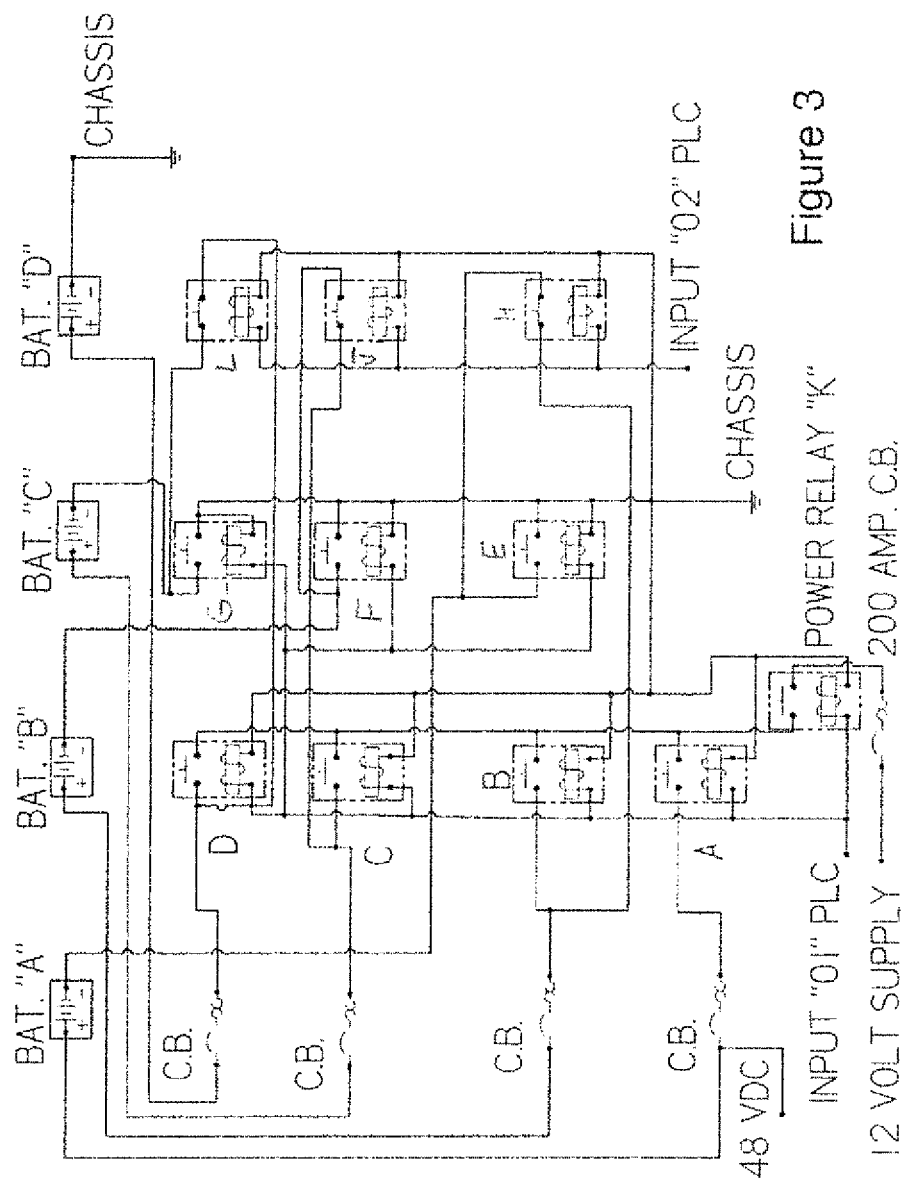
FIG. 3 is a schematic diagram of the 48 volt example embodiment with the invention in a series mode.

Typical System Components:
A sufficient number of 12 volt storage batteries that when wired in "series" provide the desired DC voltage. Example: Two batteries for 24 VDC, three batteries for 36 VDC, 4 Batteries for 48 VDC, etc.;
One master power solenoid, continuous duty with a 12 volt coil capable of switching 200 amps (See Power Relay "K" on drawing FIGS. 1,2 & 3);

One programmable controller or micro-processor to control the system logic (see "Output 1 & Output 2 and output 3 in FIGS. 2 & 3);
Load solenoids, continuous duty, for switching between "parallel" and "series" mode. A 48 VDC system requires ten (10) such solenoids with 12 VDC coils and capable of switching 100 amps (See in FIGS. 2 & 3: A, B, C, D, E F, G, H, J & L). Note: a 36 VDC motor requires eight (8) such solenoids and a 24 VDC system requires six (6) such solenoids
Four batteries for a 48 VDC voltage output, 3 batteries for a 36 VDC voltage output, 2 batteries for a 24 VDC voltage output (See in FIGS. 2 & 3: batteries, A B, C & D); and
Two each Analog PLC Inputs (See FIG. 1: I02 & I03) that read 10 to 20 VDC.

How the Power Management Module Works:
This invention is reliant on feedback in the form of a start and stop command from the equipment to which the Power Management Module is metering electromotive force.

The example used here is based on a 48 volt system with four 12 volt batteries. This scenario is based on a vehicle mounted electric 6 hp, 48 volt, 3-phase AC motor with a 48 volt motor controller that draws 40 amperes per hour at 48 volts when running. The air compressor is typical of a 6 hp compressor that runs on 220 volt AC power, in that it compresses 22 cubic feet of air per minute to 175 psi. However in this example, the compressor is mounted on a service truck that is used to run air tools and inflate tires. For this explanation we are to consider that the truck has a 12 volt electrical system with at least a 135 ampere hour alternator for battery charging.

Explanation of the Ladder Logic (FIG. 1)
NOTE: Initially, all relays are open, there is no power to any of the relay coils, all relay contacts are in an OPEN state. All batteries are isolated from one another and from the truck batteries.
1. When the air pressure in the reservoir of the vehicle mounted air compressor drops to a level that triggers the switch to run the compressor, 12 volts from the vehicle battery system is switched through the pressure switch to the Input on the PLC (See FIG. 1).
If Analog Input I03 (See FIG. 1) registers a voltage above 11 volts, then
a) All solenoids (see FIG. 3) A, B, C, D, E, F, G, H, J, L & K are switched off. All batteries are isolated from one another and the truck battery system.
b) One second later, Output 2 from the PLC (See FIG. 3) is turned on which in turn energizes relays H, J & L, which in turn configures batteries A, B, C & D to a series configuration to provide 48 volts DC to the compressor motor, to run the compressor.
OR:
If Analog Input I03 registers a voltage below 11 volts, then the system will not switch to series mode until the Power Management Module Batteries register over 12.8 volts, which means the truck engine must be run to increase the truck battery voltage to facilitate charging the Power Management Module Battery Bank.
2) When the Compressor Reservoir is charged to its high limit, the compressor pressure switch will switch to "open contacts". When this happens, PLC input contacts no longer have a 12 volt signal;
a) Relays H, J, & L drop out, once again isolating all batteries.

b) If Analog Input I02 registers a voltage of over 12.8 volts on the vehicle battery, and, if the Power Management Module batteries are of a lesser voltage than the vehicle batteries, then a) One second later, PLC Output 1 closes, providing a 12 volt signal voltage to relays coils A, B, C, D, E, F & G, thereby closing the relay contacts. (Note; Contacts are closed before current is turned on to them. Arcing cannot happen as the contacts are already closed.

NOTE: PLC Analog inputs compare the voltage between I02, the vehicle battery and I03, the Power Management Module batteries. If the Power Management Module batteries have a higher voltage than the vehicle batteries, then the system will not switch to a Parallel state to prevent back charging the vehicle batteries and reducing the effective run time of the Power Management Module batteries.

b) One second later, PLC Output 3 closes, providing 12 volt signal voltage to Power Relay "K", which in turn closes contacts to provide 12 volt power to batteries A, B, C & D to charge.

If the vehicle battery system drops below 12.8 volts as measured by PLC Analog input I02 (a voltage that insures an ability to start the vehicle engine), then PLC Output 1, will not close to power A, B, C, D, E F & G. and Power Relay K will not engage. Parallel Mode FIG. #2

If

1) If the vehicle battery voltage is greater than 12.8 volts and
2) The Power Management Batteries have a charge less than the vehicle battery voltage, then a) Relays A, B, C, D, E, F, and G are energized, the relay contacts become closed.

NOTE: Relays H, J, and L are open as depicted in FIG. 2.

b) One second later, Power Relay (K) is energized. This provides power to charge the Power Management Module batteries A, B, C and D. As depicted in FIG. 2, each individual battery Plus side (+) becomes connected to the Positive side of the truck battery and each negative battery pole becomes connected to the Negative (chassis) side.

c) When the batteries become completely charged, the vehicle alternator will adjust itself to provide an appropriate trickle charge.

Series Mode FIG. 3

1) When the PLC receives a 12 volt signal Input from the compressor, indicating a low limit setting, (See PLC Input, FIG. 1)

a) The Power Relay (K) is switched off via PLC Output #3.
b) One second later relays A, B, C, D, B, F and G are switched off via PLC Output 1.
c) One second later, relays H, J, and L are energized via PLC Output 2. (FIG. 3). This in turn allows current to flow from Battery D−(Chassis) to Battery D+ (12 volts) to relay L thru to Battery C−, to Battery C+ (24 volts), to relay J, thru J to Battery B−, to Battery B+ (36 volts), to Relay H, thru H to Battery A−, to A+ (48 volts) to 48 volt motor controller.

NOTE; There are many types of equipment now available that require 48 VDC voltage that converts power for brushless DC or three phase power. It is not the purpose of this invention to limit the use of this invention to just one type of motor controller, but merely show that high amperage 48 volt power can be delivered for intermittent use.

2) When the compressor pressure sensing contacts go open (Reservoir pressure reaches 175 psi), a) PLC INPUT (FIG. 1) drops out, Relays H, J, and L are de-energized and go to OPEN state (FIG. #2)
b) When the PLC Input 2 (See FIG. 1) senses that the vehicle charging system has a voltage greater than 12.8 volts and a voltage greater than the Power Management Module battery voltage, the system reverts to Parallel Charge as described above.

In summary, the Power Management Module interfaces equipment meant to operate on high voltage equipment, heretofore unable to run on 12 volt vehicular electrical systems. The novel concept that charging can take place intermittently while the high voltage motor is not running allows for the use of new technology type motors such as the 48 volt, 3-phase, AC motors to do the work relegated to ancillary internal combustion motors.

It should be understood that the preceding is merely a detailed description of one or more embodiments of this invention and that numerous changes to the disclosed embodiments can be made in accordance with the disclosure herein without departing from the spirit and scope of the invention. The preceding description, therefore, is not meant to limit the scope of the invention. Rather, the scope of the invention is to be determined only by the appended claims and their equivalents.

I claim:

1. A vehicle power system comprising:
a vehicle power source configured to output a first voltage;
a plurality of batteries, each battery configured to provide a second voltage;
a plurality of switches coupled between said batteries; and
a controller coupled to said plurality of switches and configured to
place said plurality of switches in a first mode of operation so that said plurality of batteries is coupled in parallel and receives a charge from said vehicle power source, and
place said plurality of switches in a second mode of operation so that said plurality of batteries is coupled in series and provides a combined voltage greater than the first voltage and the second voltage, the combined voltage driving a load.

2. The vehicle power system of claim 1 wherein said controller has a first input coupled to an output of said vehicle power source; and wherein said controller is configured to place said plurality of switches in the first mode of operation only when the first voltage is greater than or equal to a threshold voltage.

3. The vehicle power system of claim 2 wherein said controller has a second input coupled to an output of said plurality of batteries; and wherein said controller is configured to place said plurality of switches in the first mode of operation only when the second voltage is less than the threshold voltage.

4. The vehicle power system of claim 1 wherein said controller has a third input coupled to the load; and wherein said controller is configured to place said plurality of switches in the first and second modes of operation based upon an operational characteristic of the load.

5. The vehicle power system of claim 1 further comprising a power switch coupled between the vehicle power source and each battery of said plurality thereof.

6. The vehicle power system of claim 5 wherein said controller is configured to control said power switch.

7. The vehicle power system of claim 5 wherein said controller is configured to close said power switch after said plurality of switches has entered the first mode of operation.

8. The vehicle power system of claim 5 wherein said controller is configured to open said power switch in the second mode of operation.

9. The vehicle power system of claim 1 wherein said vehicle power source comprises a vehicle starter battery, and an alternator coupled thereto.

10. A vehicle power system comprising:
a vehicle power source configured to output a first voltage, said vehicle power source comprising a vehicle starter battery, and an alternator coupled thereto;
a plurality of batteries, each battery configured to provide a second voltage;
a plurality of switches coupled between said batteries;
a power switch coupled between the vehicle power source and each battery of said plurality thereof; and
a controller coupled to said plurality of switches and configured to
place said plurality of switches in a first mode of operation so that said plurality of batteries is coupled in parallel and receives a charge from said vehicle power source, and
place said plurality of switches in a second mode of operation so that said plurality of batteries is coupled in series and provides a combined voltage greater than the first voltage and the second voltage, the combined voltage driving a load.

11. The vehicle power system of claim 10 wherein said controller has a first input coupled to an output of said vehicle power source; and wherein said controller is configured to place said plurality of switches in the first mode of operation only when the first voltage is greater than or equal to a threshold voltage.

12. The vehicle power system of claim 11 wherein said controller has a second input coupled to an output of said plurality of batteries; and wherein said controller is configured to place said plurality of switches in the first mode of operation only when the second voltage is less than the threshold voltage.

13. The vehicle power system of claim 10 wherein said controller has a third input coupled to the load; and wherein said controller is configured to place said plurality of switches in the first and second modes of operation based upon an operational characteristic of the load.

14. The vehicle power system of claim 10 wherein said controller is configured to control said power switch.

15. The vehicle power system of claim 10 wherein said controller is configured to close said power switch after said plurality of switches has entered the first mode of operation.

16. The vehicle power system of claim 10 wherein said controller is configured to open said power switch in the second mode of operation.

17. A method of operating a vehicle power system comprising:
operating a vehicle power source to output a first voltage;
operating a plurality of batteries so that each battery provides a second voltage;
operating a controller coupled to a plurality of switches, the plurality of switches being coupled between the plurality of batteries; and
operating the controller to
place the plurality of switches in a first mode of operation so that the plurality of batteries is coupled in parallel and receives a charge from the vehicle power source, and
place the plurality of switches in a second mode of operation so that the plurality of batteries is coupled in series and provides a combined voltage greater than the first voltage and the second voltage, the combined voltage driving a load.

18. The method of claim 17 wherein the controller has a first input coupled to an output of the vehicle power source; and further comprising operating the controller to place the plurality of switches in the first mode of operation only when the first voltage is greater than or equal to a threshold voltage.

19. The method of claim 18 wherein the controller has a second input coupled to an output of the plurality of batteries; and further comprising operating the controller to place the plurality of switches in the first mode of operation only when the second voltage is less than the threshold voltage.

20. The method of claim 17 wherein the controller has a third input coupled to the load; and further comprising operating the controller to place the plurality of switches in the first and second modes of operation based upon an operational characteristic of the load.

* * * * *